United States Patent [19]
Thorburn

[11] 3,869,796
[45] Mar. 11, 1975

[54] SLOTTED CHUCK FOR TOOL HOLDER
[75] Inventor: Fred T. Thorburn, Kirkland, Wash.
[73] Assignee: Shofu Dental Corporation, Menlo Park, Calif.
[22] Filed: Dec. 11, 1972
[21] Appl. No.: 313,868

[52] U.S. Cl. .................................................. 32/26
[51] Int. Cl. ............................................. A61c 1/08
[58] Field of Search ......... 279/23, 46, 47, 48; 32/26

[56] References Cited
UNITED STATES PATENTS
3,092,908   6/1963   Flatland .............................. 279/46
FOREIGN PATENTS OR APPLICATIONS
219,193   6/1961   Austria ................................... 32/26

Primary Examiner—Robert Peshock

[57] ABSTRACT

A slotted chuck for a tool holder of the type having a hollow cylindrical spindle driven by a rotary motor for use with a tool having a cylindrical shaft. The chuck is provided with at least one longitudinal slot and at least one bend at a point on the slotted portion of the chuck. The bend or bends force the metal between the slots into frictional engagement with the tool shaft and the cylindrical spindle to hold the tool and the chuck in the spindle.

7 Claims, 2 Drawing Figures

SLOTTED CHUCK FOR TOOL HOLDER

BACKGROUND OF THE INVENTION

1. Field of the Invention

This invention pertains to tool holders, such as for dental tools, and more particularly to a slotted chuck for holding a tool in a hollow cylindrical spindle powered by a rotary motor.

2. Description of the Prior Art

Tool holders for use by dental technicians and other tools for cutting and polishing generally employ air, electrical, or belt driven power as the source of rotary motion. These rotary mechanisms generally drive a hollow cylindrical spindle mounted in bearings or bushings. A tool having a cylindrical shaft is then fitted within the spindle and held therein by various types of chuck mechanisms. In one prior art device the chuck mechanism is merely a cylindrical plastic sleeve having an inherent resiliency which firmly holds the tool in the spindle. These plastic sleeves, however, wear rapidly when the tools are frequently changed and when used in an abrasive atmosphere such as occurs when grinding dentures. Other slotted chuck mechanisms heretofore known employ various threads, tapers, or cams as locking, keeping, or tightening devices and separate wrench type tools for locking or tightening, causing them to be quite expensive to manufacture.

SUMMARY OF THE INVENTION

It is an object of this invention to provide a slotted chuck for rotary tool holders which hold itself in the spindle of the rotary tool holder without a separate locking, keeping, compressing, or tightening device or tool.

It is an object of this invention to provide a slotted chuck for rotary tool holders which may be inserted within a cylindrical spindle without the use of loosening or adjusting devices and which holds itself and the cutting tool within the spindle without separate locking, keeping, compressing or tightening devices.

It is an object of this invention to provide a slotted chuck for a hollow spindle of a rotary tool holder which allows tools to be inserted and withdrawn rapidly without the necessity of separate devices or tools to loosen, unlock or open the chuck.

It is another object of this invention to provide chuck for a hollow spindle of a rotary tool holder which is long lasting and inexpensive to manufacture.

Basically the chuck comprises frictional spindle-engaging outer surfaces and frictional toolshaft-engaging inner surfaces which are pressed radially against the respective spindle and toolshaft when a tool is inserted into the chuck. The chuck is pressed into place within the spindle and is held by the friction of a radial arc or radial arcs pressing against the spindle. The toolshaft is pressed into place within the chuck and is held by a radial arc or radial acrs pressing against the toolshaft. The frictional force created between the spindle and the chuck is greater than the frictional force created between the chuck and the toolshaft, allowing the toolshaft to be withdrawn while leaving the chuck within the spindle.

DESCRIPTION OF THE PREFERRED EMBODIMENTS

Figure 1:
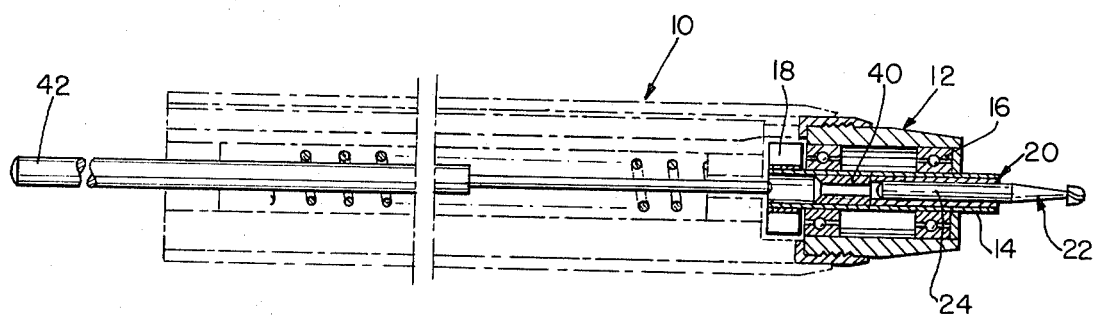
FIG. 1 is a longitudinal section with parts in phantom lines of a typical small tool holder embodying the principles of the invention.

As best shown in FIG. 1, a typical small tool holder 10 of the type used by dental technicians is provided with a rotary motor 12. In the embodiment illustrated the rotary motor is an air driven turbine; however, other power sources such as electric motors or belt drives are also suitable. The rotary tool holder employs a hollow cylindrical spindle 14 mounted within bearings 16 and driven by the turbine 18. Fitted within the spindle 14 is a chuck 20 which holds a conventional burr 22 or other tool having a cylindrical shaft 24.

The chuck in the preferred embodiment is made of long-wearing metal. The long-wearing characteristic of the chuck is essential in applications where the tool 22 is frequently changed, particularly where used in an abrasive atmosphere as commonly occurs when grinding or cutting.

It is a unique feature of this invention that the chuck 20 is self-restrained in that it holds itself within the cylindrical spindle 14 while holding the tool 22, using no locking, tightening, clamping or compressing devices or tools separate from the chuck itself. In order to hold the tool in the chuck 20, the chuck is provided with longitudinal slots 30, in the preferred embodiment four slots. The opposite outer end of the chuck terminates in a non-slotted end 32 which is positioned generally flush with the outer end of the spindle 14. The metal between the slots 30 is provided with two bends 36 and 38 which causes the outer diameter of the metal between the slots to exceed the inner diameter of the spindle when the chuck is out of the spindle. The chuck is compressed and pressed into the spindle 14 into the position shown in FIG. 1.

Figure 2:
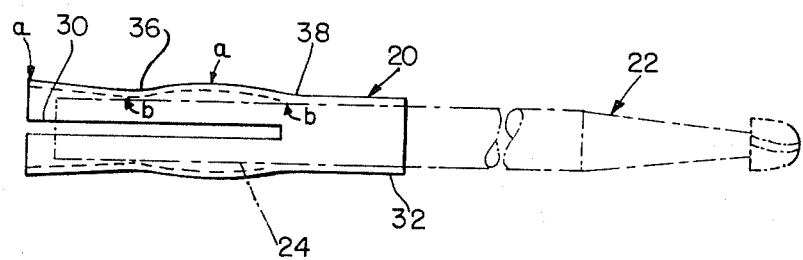
FIG. 2 is a side elevation of a chuck embodying the principles of the invention.

To install a tool into the chuck, the shaft 24 of the tool 22 is pressed into the chuck. The bends 36 and 38 are such that they extend into the path of the shaft 24 and deformed radially outwardly as the shaft is pressed into the chuck. As best shown in FIG. 1, the bends are deformed until the chuck is approximately cylindrical in configuration. The inner surfaces of the bends at the slotted portion of the chuck tightly engage the cylindrical surface of the shaft 24 to hold the tool in the chuck. At the same time the outer surfaces of the chuck between the bends and at the end of the slots of the chuck firmly hold the chuck in frictional engagement with the inside surface of the spindle 14. Arrows $a$ indicate the points of contact between the chuck and the spindle, whereas arrows $b$ indicate the points of contact between the shaft 24 and the inside of the chuck. These are indicated in FIG. 2 for illustration purposes only, it being understood that in actual practice the chuck will be of a more cylindrical configuration when inserted in the spindle 14 and as illustrated in FIG. 1.

The frictional force created between the spindle 14 and the chuck 20 is greater than the frictional force created between the chuck 20 and the toolshaft 24. Consequently, removal of the tool will leave the chuck within the spindle 14.

The two bends 36 and 38 create radial arcs of contact which assure concentricity between the axis of the tool and the axis of the spindle to minimize the rotational vibration of the tool when in use. Although the two-point contact is a desirable feature, in some instances a single bend may be employed. The chuck may be slotted at both ends, or be made with only one end slotted, and only one slot on that one end. Furthermore, other frictional engaging techniques, such as machining the chuck to the configuration of FIG. 2 rather than bending could also be employed.

A stop member 40 is tightly pressed into the spindle 14 and has an inner diameter less than the diameter of the shaft 24 and serves as a stop for both the tool and the chuck 20. The stop member is also hollow and provides access for an ejector pin 42 to remove the tool. The tool is removed either by pulling or pushing it from the chuck.

The chuck can be removed after removal of the tool 22 by pulling it out with the burr end of the tool 22.

While the preferred form of the unique chuck has been illustrated and described, it should be understood that variations and laternations will be apparent to one skilled in the art without departing from the principles of the invention. Accordingly, the invention is not to be limited to the specific form illustrated, but rather is to be limited only by a literal interpretation of the claims appended hereto.

The embodiments of the invention in which an exclusive property or privilege is claimed are defined as follows:

1. A slotted chuck for a tool holder of the type having a hollow cylindrical spindle driven by a rotary motor for use with a tool having a cylindrical shaft comprising;
    holding means having a resilient slotted end connected to a continuous cylindrical end and insertable within said spindle for holding the shaft of said tool within said spindle, said slotted end including an outer frictional surface permanently bent radially outwardly into engagement with inner surface of the spindle, an inner frictional surface deflectable radially into engagement with the outer surface of the toolshaft, said outer frictional surface lying longitudinally more closely to said continuous cylindrical end than said inner frictional surface whereby a greater friction force is effected between the spindle and the chuck than between the chuck and the tool shaft and wherein said frictional surfaces are deflected by the toolshaft upon insertion into the resilient slotted end within the spindle to tightly press said outer surface and said inner surface against said respective spindle and toolshaft surfaces.

2. The chuck of claim 1 said outer frictional surface having an undeflected diameter greater than the diameter of the spindle inner surface, said inner frictional surface having an undeflected diameter when inserted in said spindle less than the diameter of the toolshaft outer surface wherein said outer frictional surface must be deflected inwardly to be received in the spindle and the inner frictional surface must be deflected outwardly by the toolshaft to receive the toolshaft.

3. The chuck of claim 2 said resilient slotted end including at least two concentric bends spaced along the longitudinal axis thereof for pressing said frictional surfaces against said toolshaft and spindle at two concentric longitudinally spaced arcs to position said toolshaft centrally on the longitudinal axis of the spindle.

4. The chuck of claim 2 said resilient slotted end including at least four longitudinal slots.

5. The chuck of claim 3 said resilient slotted end including at least four longitudinal slots.

6. A slotted chuck for a tool holder of the type having a hollow cylindrical spindle driven by a rotary motor for use with a tool having a cylindrical shaft comprising:
    means insertable within said spindle for holding the shaft of said tool in said spindle, said holding means including an outer friction surface engaging the inside of the spindle, an inner friction surface engaging the outside of the toolshaft, and means pressing said outer friction surface more tightly against said spindle than said inner friction surface is pressed against said toolshaft, without the necessity of separate tightening, clamping, compressing or locking devices commonly used in similar tools employing threads, tapers or cams to hold, tighten, compress or lock said slotted chucks.

7. The chuck of claim 6 said holding means including at least one longitudinal slot beginning at a cylindrical end in said chuck and at least one radially outwardly directed bend along the slotted portion, the outer friction surface being formed by said radially outwardly directed bend and lying closer to said cylindrical end than said inner friction surface thereby giving the outer friction surface a shorter lever arm from said cylindrical end than said inner friction surface, whereby when insertion of a toolshaft presses the chuck simultaneously against the toolshaft and the spindle a greater frictional force is created between said spindle and chuck than is created between the chuck and the toolshaft to allow withdrawal of said toolshaft without removing the chuck.

* * * * *